(12) United States Patent
Shusteff et al.

(10) Patent No.: US 10,875,247 B2
(45) Date of Patent: Dec. 29, 2020

(54) MULTI-BEAM RESIN CURING SYSTEM AND METHOD FOR WHOLE-VOLUME ADDITIVE MANUFACTURING

(71) Applicant: Lawrence Livermore National Security, LLC, Livermore, CA (US)

(72) Inventors: Maxim Shusteff, Livermore, CA (US); Christopher M. Spadaccini, Livermore, CA (US); Nicholas Fang, Livermore, CA (US); Robert Matthew Panas, Livermore, CA (US); Johannes Henriksson, Livermore, CA (US); Brett Kelly, Livermore, CA (US); Allison E. Browar, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 317 days.

(21) Appl. No.: 15/651,861

(22) Filed: Jul. 17, 2017

(65) Prior Publication Data
US 2018/0015672 A1    Jan. 18, 2018

Related U.S. Application Data

(60) Provisional application No. 62/363,078, filed on Jul. 15, 2016.

(51) Int. Cl.
*B29C 64/282* (2017.01)
*G03H 1/22* (2006.01)
(Continued)

(52) U.S. Cl.
CPC .......... *B29C 64/282* (2017.08); *B29C 64/124* (2017.08); *B29C 64/264* (2017.08);
(Continued)

(58) Field of Classification Search
CPC .......... B29C 64/264; B29C 2035/0827; B29C 64/268; B29C 64/277; B29C 71/04;
(Continued)

(56) References Cited

U.S. PATENT DOCUMENTS

| 4,041,476 A | * | 8/1977 | Swainson | .............. B01J 19/121 365/119 |
| 5,589,955 A |  | 12/1996 | Amako et al. | |

(Continued)

OTHER PUBLICATIONS

N. J. Jenness, R. T. Hill, A. Hucknall, A. Chilkoti, R. L. Clark, "A versatile diffractive maskless lithography for single-shot and serial microfabrication", Opt. Express 18, 11754-11762, May 2010.*
(Continued)

*Primary Examiner* — Philip C Tucker
*Assistant Examiner* — Jimmy R Smith, Jr.
(74) *Attorney, Agent, or Firm* — James S. Tak

(57) ABSTRACT

A multi-beam volumetric resin curing system and method for whole-volume additive manufacturing of an object includes a bath containing a photosensitive resin, a light source for producing a light beam, and a spatial light modulator which produces a phase- or intensity-modulated light beam by impressing a phase profile or intensity profile of an image onto a light beam received from the light source. The system and method also include projection optics which then produces multiple sub-image beams from the modulated light beam which are projected to intersect each other in the photosensitive resin to cure select volumetric regions of the resin in a whole-volume three-dimensional pattern representing the object.

5 Claims, 3 Drawing Sheets

(51) Int. Cl.

| | | |
|---|---|---|
| *B29C 64/268* | (2017.01) | |
| *B33Y 30/00* | (2015.01) | |
| *B29C 64/286* | (2017.01) | |
| *B29C 64/264* | (2017.01) | |
| *B29C 64/124* | (2017.01) | |
| *B33Y 10/00* | (2015.01) | |
| *G03H 1/00* | (2006.01) | |
| *G03H 1/04* | (2006.01) | |

(52) U.S. Cl.
CPC .......... *B29C 64/268* (2017.08); *B29C 64/286* (2017.08); *B33Y 10/00* (2014.12); *B33Y 30/00* (2014.12); *G03H 1/0005* (2013.01); *G03H 1/2205* (2013.01); *G03H 1/2294* (2013.01); *G03H 2001/0094* (2013.01); *G03H 2001/0491* (2013.01); *G03H 2001/221* (2013.01); *G03H 2001/2207* (2013.01); *G03H 2210/30* (2013.01); *G03H 2210/33* (2013.01); *G03H 2225/22* (2013.01); *G03H 2225/32* (2013.01); *G03H 2225/52* (2013.01)

(58) Field of Classification Search
CPC ............ B29C 2045/0075; B29C 33/06; B29C 35/0805; G03H 2001/2207; G03H 1/0005; G03H 1/2205; G03H 1/2294; G03H 2001/0094; G03H 2001/221; G03H 2210/30; G03H 2210/33; G03H 2225/22; G03H 2225/32; G03H 2225/52
USPC .............................................. 425/174, 174.4
See application file for complete search history.

(56) References Cited

U.S. PATENT DOCUMENTS

| | | |
|---|---|---|
| 7,088,432 B2 | 8/2006 | Zhang |
| 7,094,345 B2 | 8/2006 | Gilbert et al. |
| 7,538,858 B2 | 5/2009 | Mackey |
| 8,649,094 B2 | 2/2014 | Kurtz et al. |
| 2006/0131494 A1* | 6/2006 | Grier ........................ G03H 1/08 250/251 |
| 2006/0279822 A1* | 12/2006 | Kmeta .................... G03H 1/02 359/15 |
| 2009/0203216 A1 | 8/2009 | Mackey |
| 2015/0309473 A1 | 10/2015 | Spadaccini et al. |

OTHER PUBLICATIONS

Chen, Jian et al., "Far-field superlens for nanolithography", 2010, Chin. Phys. B, 19.3, 034202-1-034202-7.

Sun, C., Fang, N., Wu, D.M., Zhang, X., "Projection microstereolithography using digital micro-mirror dynamic mask," Sensors and Actuators: A Physical, 121 (2005), pp. 113-120.

Kawata, S., Sun, H-B., Tanaka, T., Takada, K., "Finer features for functional microdevices," Nature, vol. 412, Aug. 16, 2001, pp. 697-698.

Sun, H-B., Kawakami, T., Xu, Y., Ye, J-Y., Matuso, S., Misawa, H., Miwa, M., Kaneko, R., "Real three-dimensional microstructures fabricated by photopolymerization of resins through two-photon absorption," Optics Letters, vol. 25, No. 15, Aug. 1, 2000, pp. 1110-1112.

Bertsch, A., Jiguet, S., Hofmann, H., Renaud, P., "Ceramic microcomponents by microstereolithography," 17th IEEE Conference on MEMS, p. 728, 2004.

Pendry, J.B., "Negative refraction makes a perfect lens," Phys. Rev. Lett., 85, 3966-3969, 2000.

Liu, Z.W., Fang, N., Yen, T-J., Zhang, X., "Rapid growth of evanescent wave by a silver superlens," Appl. Phys. Lett., 83, 5184-5186, 2003.

Fang, N., Lee, H., Sun, C., Zhang, X., "Sub-diffraction-limited optical imaging with a silver superlens," Science, 308, 534-537, 2005.

Liu, Z., Durant, S., Lee, H., Pikus, Y., Fang, N., Xiong, Y., Sun, C., Zhang, X., "Far-field optical superlens," Nanoletters, 2007.

Campbell, M., Sharp, D. N., et al., "Fabrication of photonic crystals for the visible spectrum by holographic lithography", Nature, 404, pp. 53-56, 2000.

Srituravanich, et al. "Plasmonic Nanolithography", Nano Letters 2004, vol. 4, No. 6 1085-1088.

* cited by examiner

MULTI-BEAM RESIN CURING SYSTEM AND METHOD FOR WHOLE-VOLUME ADDITIVE MANUFACTURING

CROSS-REFERENCES TO RELATED APPLICATIONS

This application claims the benefit of U.S. Provisional Application No. 62/363,078, filed Jul. 15, 2016 and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing, and more particularly to a multi-beam resin curing system and method which simultaneously cures select volumetric regions of a photosensitive resin bath in a 3D pattern representing all of an object for whole-volume additive manufacturing of the object.

BACKGROUND OF THE INVENTION

Additive manufacturing (AM) generally refers to various processes and technologies that build structures "bottom up," by progressively adding material. A generalized AM process begins from a three-dimensional (3D) CAD model of a part, which is sectioned into layers by closely-spaced parallel planes. Each layer is then built up or deposited at a specified thickness, with its computer-generated geometry defining the extent of the deposition. The substrate on which the build is forming is repositioned, and the next layer is added in sequence, until the full set of slices comprising the part has been formed. Deposition methods vary widely, such as for example, from material extrusion, to solidification of liquid resin, to binding/sintering of powder feedstock. All are enabled by advancements in computer modeling and data manipulation, as well as computer control and automation of the pertinent hardware.

AM has also enabled the investigation and research into the design of architected metamaterials, which refers to materials with an engineered structure, usually micro- or nano-scale, which exhibit characteristics not found in nature, or not seen in bulk or monolithic materials, and which in many cases cannot be produced using conventional machining and manufacturing methods. However, one of the challenges that metamaterials research and development must overcome is the relatively low throughput of AM. Producing a micro-architected material requires its microstructure to extend over macroscopic length scales, which can be a factor of, for example, $\sim 10^5$ or more larger than the smallest structural elements. Yet virtually all existing AM approaches must trade off fabrication speed and overall part size against resolution and minimum feature size. For a broad range of AM technologies, the ratio of maximum linear part dimension to minimum feature size is $\sim 10^2$-$10^3$. In some cases, this can be augmented by another factor of $\sim 10$ using "stitching" techniques to fabricate multiple build areas adjacent to each other, but such parts can take days to build. Thus, fabrication speed is an essential performance metric of any AM method, and depends critically on the complexity and dimensionality of the unit operation of the process relative to the total build.

To consider the possible range of these unit operations, the lowest-throughput processes deposit or photopolymerize one voxel at a time in serial fashion, which can be referred to as "zero-dimensional" or "0D" fabrication. This includes technologies such as conventional stereolithography (SL), and metal powder-bed-based laser fusing systems. A more advanced technology is direct laser writing (DLW), which offers the capability of writing arbitrary paths in 3D space (we can refer to this as "0D+"), rather than being constrained to planar layers. Similarly, the familiar fused-deposition modeling (FDM) method used by desktop 3D printers writing with extruded melted plastic is a one-dimensional or "1D" filament-based process, and its more sophisticated counterpart of direct ink writing (DIW) is a "1D+" process capable of depositing filaments in 3D space. Nevertheless, these are all still fundamentally serial processes, and inherently low-throughput.

Advancements based on layer-at-once rather than voxel-at-once fabrication have led to techniques that may be characterized as "two-dimensional plus" or "2D+". One example is projection micro-stereolithography (PμSL), in which an LED-illuminated microdisplay is used to project full two-dimensional images to cross-link a photopolymer resin. This enables a significant gain in speed. In the 2D+ PμSL platform, liquid crystal-on-silicon (LCoS) spatial light modulator (SLM) devices are an enabling core component. LCoS SLMs shape the light field by modulating the phase or the amplitude of light incident upon them. Phase-only LCoS SLMs have been used for holographic light-field shaping, with particularly vigorous research activities in optical trapping applications.

Notwithstanding these advances, PμSL and other 2D+ approaches still have some limitations inherent to building 2D layers. For example, some geometries such as overhangs are difficult or impossible to reproduce accurately. Therefore, while the 2D nature of projection stereolithography is a substantial speed boost over point scanned systems, it still requires a stepping process between each successive 2D layers in a 3D volume. These steps are generally carried out by moving the fluid bath to expose fresh resin, but this mechanical process is intrinsically much slower than the rapid curing physics. So while the intrinsic physics of stereolithography is rapid (ms time scale), the process is often rather slow (>1 s time scale).

Therefore, what is still needed is a system and method capable of producing arbitrary and aperiodic 3D geometries at an improved rate and with better surface control.

SUMMARY OF THE INVENTION

One aspect of the present invention includes a multi-beam resin curing system for whole-volume additive manufacturing of an object, comprising: a bath containing a photosensitive resin; a light source for producing a light beam; a spatial light modulator (SLM) adapted to impress an image onto the light beam so as to produce a modulated light beam; and projection optics adapted to produce at least two sub-image beams from the modulated light beam with each sub-image beam having an intensity profile corresponding to a section of the image, and project the at least two sub-image beams to intersect each other in the photosensitive resin so as to simultaneously cure select volumetric regions thereof in a 3D pattern representing all of the object.

Another aspect of the present invention includes a multi-beam resin curing method for whole-volume additive manufacturing of an object, comprising: illuminating a spatial light modulator (SLM) with a light beam from a light source; controlling the SLM to impress an image onto the light beam so as to produce a modulated light beam; and using projection optics to produce at least two sub-image beams from the modulated light beam with each sub-image beam having an intensity profile corresponding to a section of the image, and project the at least two sub-image beams to intersect each other in a photosensitive resin bath so as to simultaneously cure select volumetric regions thereof in a 3D pattern representing all of the object.

And another aspect of the present invention includes a multi-beam resin curing system for whole-volume additive manufacturing of an object, comprising: a bath containing a photosensitive resin; a single mode laser source for producing a laser beam; a spatial light modulator (SLM) adapted to impress a phase profile of an image onto the laser beam so as to produce a phase-modulated laser beam; and projection optics adapted to deconvolve the phase-modulated laser beam into an intensity-modulated laser beam, produce at least two sub-image beams from the intensity-modulated laser beam with each sub-image beam having an intensity profile corresponding to a section of the image, and project the at least two sub-image beams to intersect substantially orthogonal to each other in the photosensitive resin so as to simultaneously cure select volumetric regions thereof in a 3D pattern representing all of the object.

Generally, the present invention is directed to a multi-beam volumetric resin curing system and method for whole-volume additive manufacturing that uses phase or amplitude (intensity) modulation of light to achieve lithographic patterning and curing of 3D geometries/patterns, including arbitrary or aperiodic 3D geometries (hereinafter referred to as "A3D"), within a photosensitive resin bath. In particular, curing regions may be optically generated at arbitrary locations in a photosensitive bath so that fabrication of a part or object having periodic or aperiodic geometries may be performed in a "whole-volume" or "volume-at-once" manner, i.e. simultaneously curing select volumetric regions representing a 3D pattern of all of the part or object, so as to increase fabrication speed, and reduce geometrical constraints on fabricated parts. The present invention enables the fabrication of 3D geometries (including A3D geometries) with whole-volume or volume-at-once capability, and equivalent part size and feature resolution in all three dimensions, to fabricate micro-architected metamaterials in useful quantities in massively parallel, high-throughput fashion.

Similar to the use of SLMs in the 2D+ PµSL platform, the present invention uses SLMs or other dynamically configurable masks, e.g. liquid crystal on silicon (LCoS) SLM devices, as an enabling core component of both the phase- and intensity-modulated embodiments of the present invention. In the phase-modulation embodiment of the present invention, holography, which is a means for using light to record 3D geometrical information as well as for shaping light fields in 3D, may be used to provide controlled delivery of light energy (e.g. from lasers, LEDs, etc.) to drive the whole-volume AM fabrication of an object. In particular, by illuminating a phase-modulating SLM with incident light from a coherent light source (e.g. a laser source or other electromagnetic energy source), and controlling the SLM (e.g. by a connected computer) to modulate the spatial distribution of the phase within the light field to impress a digital phase map or phase profile of an image (e.g. computer generated hologram) thereon, the spatial distribution of light intensity (detectable by sensors or usable for patterning) elsewhere in the light field may be controlled. Then, beam projection optics may be used to produce two or more sub-image beams from the phase-modulated light beam, where each sub-image beam has an intensity profile corresponding to a section of the image. For example, this may be accomplished by first deconvolving (using for example a Fourier transform lens) the phase-modulated output of the SLM into an intensity-modulated light beam having an intensity profile corresponding to the image and all its multiple sections, and then dividing a cross-section of the intensity-modulated light beam into the sub-image beams. The two or more sub-image beams are then projected to intersect each other in the photosensitive resin bath so as to simultaneously cure select volumetric regions of the resin bath in a 3D pattern representing all of the object, i.e. all all parts of the object are simultaneously cured.

And in the amplitude-modulation embodiment of the present invention, the light may be patterned by an amplitude-modulating SLMs (such as for example a digital micromirror device, "DMD") to similarly achieve simultaneous curing of selected locations in 3D space. The amplitude-modulating SLM is preferably illuminated by incoherent light and may be used to control the spatial distribution of intensity at the build volume by similarly projecting multiple sub-image beams to intersect in a photosensitive resin bath, where each sub-image beam has an intensity profile corresponding to a section of the image.

Whether a phase-modulated light beam or an intensity-modulated light beam is produced by the SLM, projection optics of the present invention is provided to produce at least two (e.g. 2 or 3) sub-image beams from the modulated light beam, with each sub-image beam having an intensity profile corresponding to a section of the image. The projection optics additionally functions to independently project the at least two sub-image beams to intersect each other in the photosensitive resin so as to simultaneously cure select volumetric regions thereof in a 3D pattern representing all of the object.

In this manner, the whole-volume or volume-at-once curing method of the present invention enables a significant rate increase over the layer-by-layer conventional technique from the perspective of curing volume/s. The optically driven arbitrary field generation removes the need for mechanical adjustment, allowing for the system to run at the intrinsic physical limits for curing which can be orders of magnitude fester than mechanical limits. The generation of 3D cure volumes also enables the generation of surfaces or volumes in a single exposure, rather than the standard technique of approximating surfaces via the stepped edges from many layers. The simultaneous nature of the surface generation means the curing physics helps to smooth the surface, providing the potential for superior surface finishes than conventional techniques. And furthermore, the simultaneous generation of complex shapes enables overhang structures to be produced in a single exposure. Rather than having periods where the single structure appears (layer-by-layer) as separate elements, volumetric curing allows for the curing order to be adjusted so the material is always attached together, avoiding the need for removable support structures.

BRIEF DESCRIPTION OF THE DRAWINGS

The accompanying drawings, which are incorporated into and form a part of the disclosure, are as follows.

DETAILED DESCRIPTION

Figure 1:
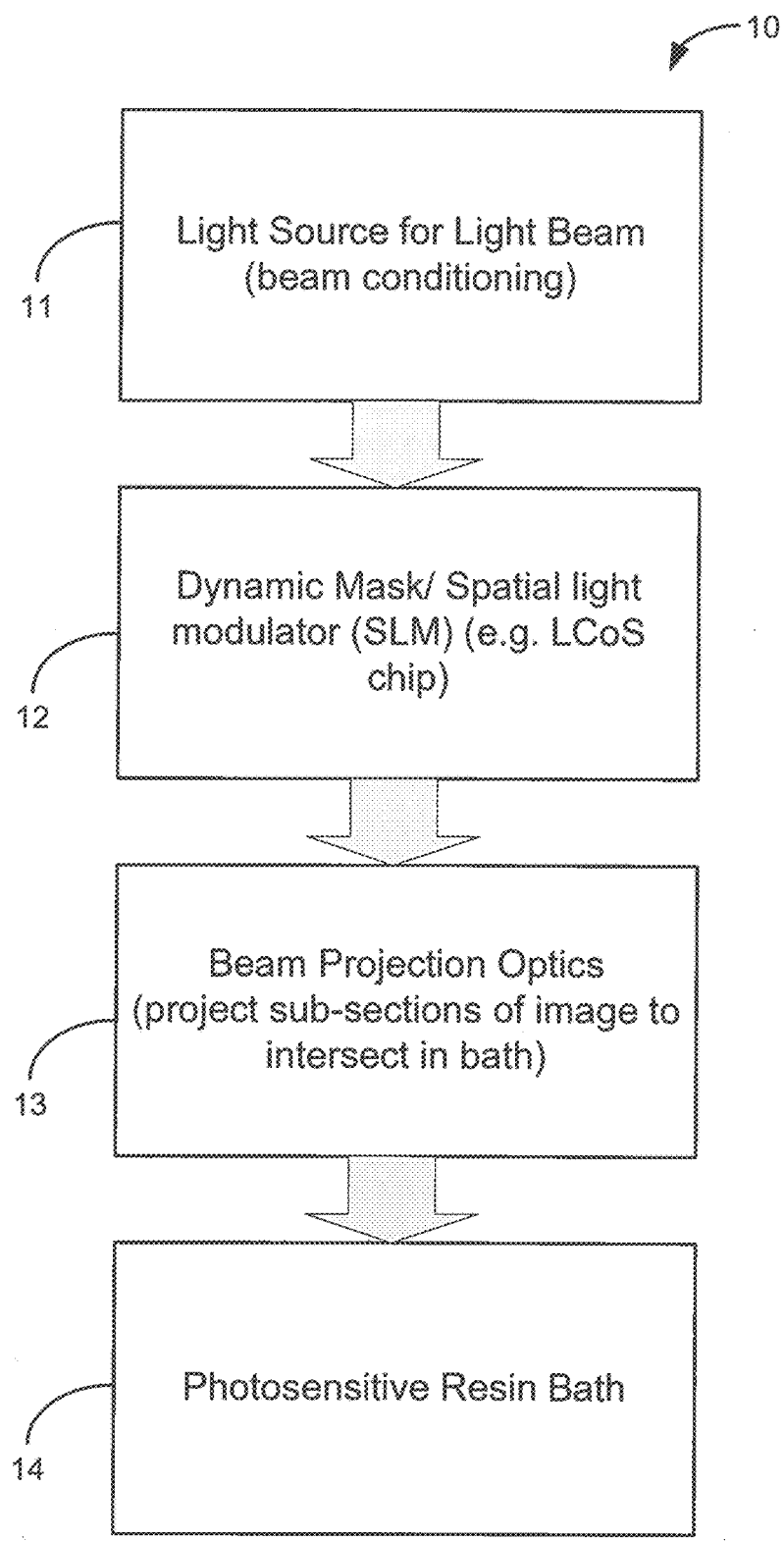
FIG. 1 is a flow diagram generally illustrating the optical path taken in the multi-beam volumetric resin curing system and method of the present invention.

Turning now to the drawings, FIG. 1 shows a flow chart 10 illustrating the overall framework of and optical path taken in the system of the present invention which shares some common features with other SL platforms. In particular-, four major subsystem blocks are shown schematically in FIG. 1. First at reference character 11, a light source and beam conditioning optics are shown for providing the illumination, i.e. a light beam, to the SLM. In a phase-modulation embodiment a coherent light source may be used, while in an intensity-modulation embodiment, an incoherent light source may be used. Next at 12, a spatial light modulator (SLM) which is defined to include all types of dynamically configurable masks for spatially modulating light, including for example a LCoS chip or DMD, is shown, which modulates the light beam received from the light source. In the phase-modulation embodiment, a phase profile of an image is impressed onto the light beam, while in the amplitude-modulation embodiment, an intensity profile of the image is impressed onto the light beam. At reference character 13, beam projection and image-relay optics is provided to deliver multiple sub-image beams of the light field shaped by the SLM to the feedstock material, i.e. photosensitive resin. And lastly at reference character 14, a liquid photosensitive resin bath is shown containing the necessary chemical components to polymerize when appropriately illuminated.

Figure 2:
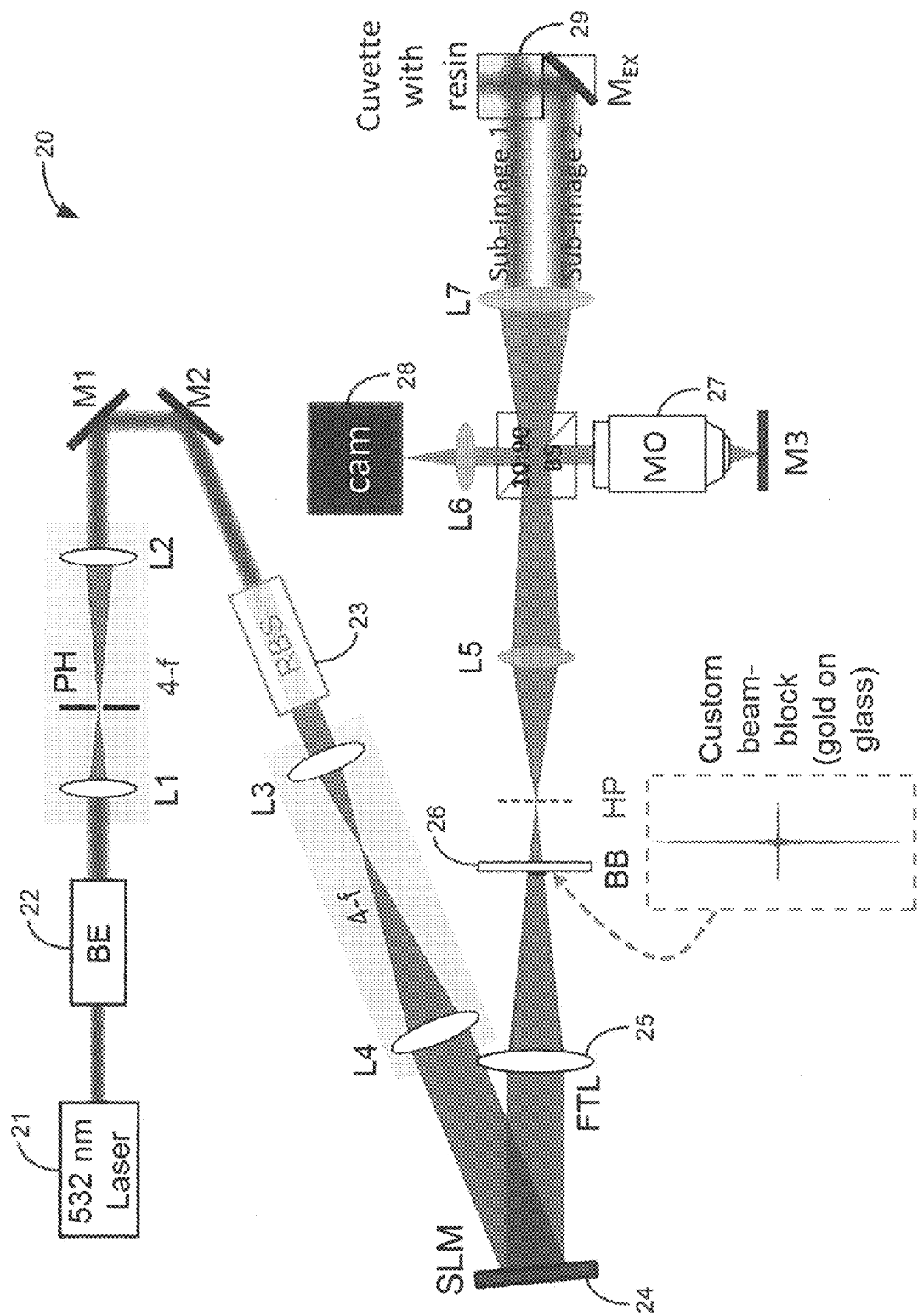
FIG. 2 shows a schematic view of first example embodiment of the system of the present invention showing the use of a Fourier transform lens to deconvolve a phase-modulated light beam into an intensity-modulated light beam from which multiple sub-images are projected to intersect in a photosensitive resin bath for whole-volume or volume-at-once curing of an object.

And FIG. 2 shows a schematic view of first example embodiment of the system of the present invention that is based on phase-modulation, showing the direction of laser propagation and the projection of multiple sub-images to intersect in a photosensitive resin bath for volume-at-once curing of an object. In particular, FIG. 2 shows a light source and beam conditioning stage upstream of the spatial light modulator (SLM) 24, and including a laser source 21, shown for example as a 532 nm laser, a beam expander (BE), lens pairs L1 and L2, and L3 and L4, which form 4-f telescope pairs, a pinhole spatial filter (PH), mirrors M1 and M2, and an optional refractive beam shaper (RBS). As a matter of convention, the direction of laser propagation (referred to as axial) is z, with the orthogonal directions (lateral coordinates) being x and y.

It is notable that the holographic principle allows the recording and reconstruction of 3D geometric information, by capturing the amplitude and phase information contained within a light field. And since holographic reconstruction requires the use of light waves capable of interference, a single-frequency laser for temporal coherence is preferably used. In addition, since the light delivered to the SLM ideally consist of flat phase-front plane waves, this implies spatial coherence is needed. Therefore, the phase-modulation embodiment of the present invention preferably uses an electromagnetic energy source with a high degree of spatial and temporal coherence, such as for example a narrow spectral linewidth, single-mode laser source, for useful diffraction and interference for holographic shaping of the light field. As an illustrative example, a 532 nm laser with a coherence length of >50 m may be used. The output beam is sized to approximately match the SLM diagonal, providing a balance in the trade-off between illumination uniformity, and efficient use of laser energy.

FIG. 2 also shows the use of an SLM shown at reference character 24 that is arranged to receive incident light from the light source 21, and which operates to impress or imprint a digital phase map or profile of a computer-generated hologram (CGH) onto the incident light. The digital phase map or CGH is required to produce a desired intensity distribution at the build volume (i.e. the photosensitive resin). In particular, with an appropriate phase pattern applied to this dynamic element (e.g. by a connected computer, not shown) the light field is Fourier-transformed by the projection optics to produce the desired intensity distribution at the build volume, photocuring the resin into the desired pattern. It is notable that holographic beam shaping is most robust and straightforward with a phase-only SLM, and the SLM may be for example a liquid-crystal-on-silicon (LCoS) pixelated phase-only SLM.

And the CGH may be iteratively calculated, for example, by the well-known Gerchberg-Saxton (G-S) algorithm to produce the desired light intensity distribution at the build volume. In the alternative, many other methods for calculating phase holograms are also known which may be used in the present invention. Some of these may result in substantially higher-quality images, but can often impose much greater computational costs, or some may only be used with limited geometries. In contrast, the G-S approach may provide simplicity, speed, as well as its generality when producing unconstrained and arbitrary image patterns, which may be useful in the present invention.

An ever-present consequence of using laser illumination is speckle, arising from self-interference of the beam as it propagates through the optical system. This stochastic intensity variation is particularly problematic for lithography, since it directly affects the fidelity of pattern reconstruction. It is straightforward to calculate multiple instances of a CGH to generate the same intensity pattern, by seeding the G-S algorithm with an initial random phase. Each of the resulting CGHs which will then have different uncorrelated noise (and thus, speckle), and exposing them in rapid succession allows for an averaging effect that significantly improves the noise performance.

FIG. 2 also shows beam projection optics downstream of the SLM 24, and including a Fourier transform lens 25, a beam block (BB) for undiffracted light, a hologram plane HP, a beam splitter (BS), a lens pair L5 and L6 which form an image-relay telescope providing a reduced size image from the hologram plane (HP) for camera 28 viewing using MO 27 and mirror M3, and lenses L5 and L7 which form an image-relay 4-f telescope pair for magnifying the HP image slightly to project it into the resin.

After a phase profile has been imprinted by the SLM 24 on the incident light field, the phase-modulated light output of the SLM is subsequently deconvolved into an intensity-distributed image by projection through the Fourier transform lens 25 (also shown as FTL in FIG. 2), which produces the Fourier transform of the SLM phase pattern at the lens focal plane. In many implementations, this lens is a microscope objective, and the phase-controlled input light field is appropriately image-relayed into the objective's back focal plane. Because the SLM is pixelated, it behaves as a diffraction grating, producing a replicate of the reflected phase-controlled light field in each of the diffracted orders. One or several of these orders may be directed into the objective. In any case, the intensity-distributed image has sub-sections, i.e. sub-images, intended for independent propagation and projection into the photopolymer resin.

One of the challenges the flexible and robust control of the light field in diffraction-based systems is eliminating interference from undiffracted light. Some fraction of the incident laser power reflects from the SLM without being modulated by the LC layer, generating an unwanted bright spot at the center of the build volume (with the intensity pattern that's the Fourier transform of the SLM rectangular aperture). Various investigators have proposed a range of approaches for handling the unmodulated spot, including compensation, beam-blocks, and displacement from the focal plane of the Fourier transforming lens. FIG. 2 shows the incorporation of a beam block 26 at the Fourier plane of the hologram projection lens, as the most robust implementation. This approach is not pattern-dependent, nor does it require exhaustive SLM calibration and aberration compensation; once the beam block is aligned, further adjustments are rarely necessary.

In an example embodiment, to create a highly efficient beam block, custom glass flats were fabricated with a gold metal film to block the spot, patterned in a "star" shape, matching the dimensions of the undiffracted spot, as shown by the inset in FIG. 2. Then, by adding a controlled phase curvature to the CGH, which increases the effective focal length of the projection lens, the desired hologram itself is displaced away from the beam block plane, thereby allowing use of the full hologram space, with virtually no interference from undiffracted light.

Figure 3:
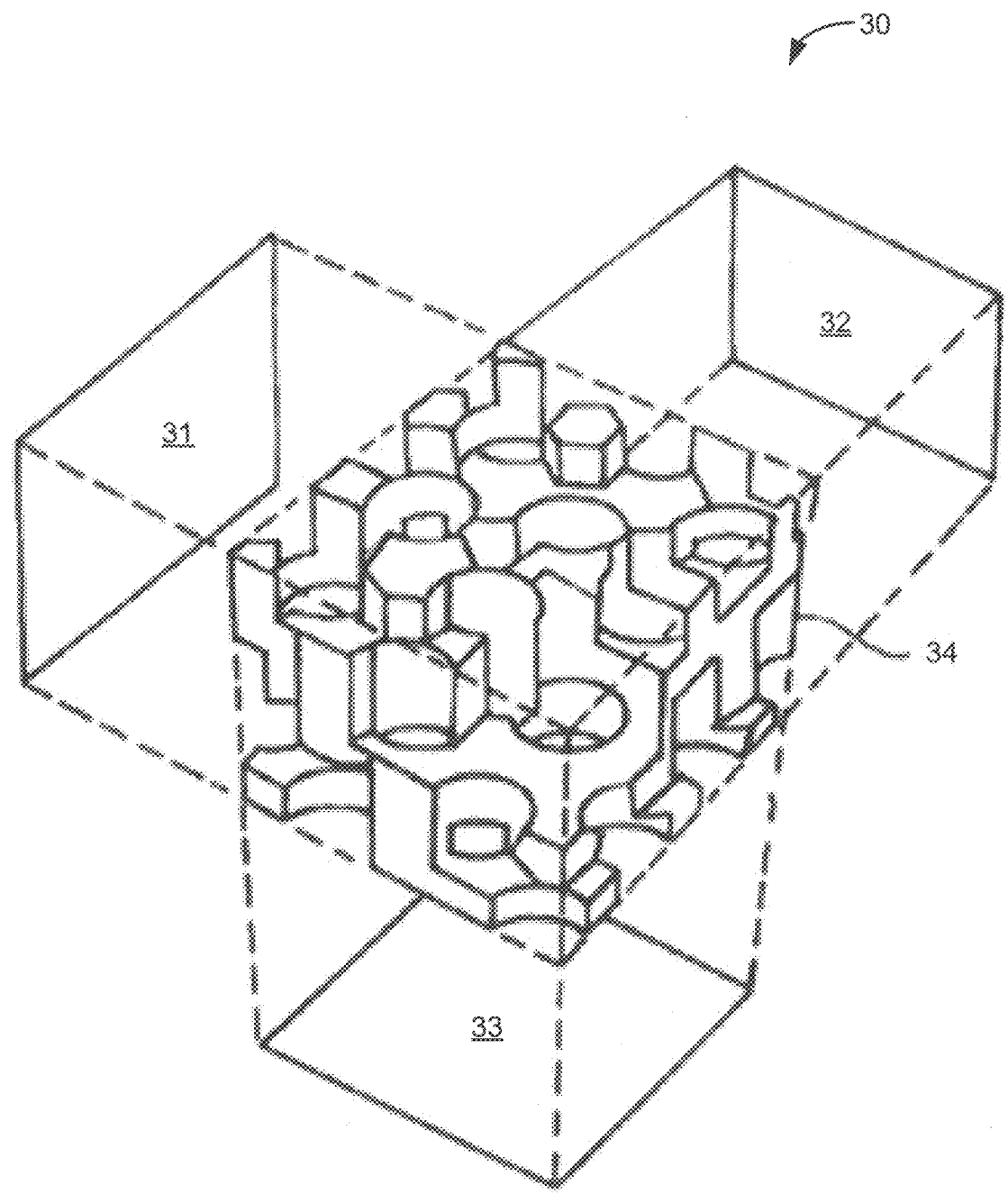
FIG. 3 shows an isometric illustration of three subsections of an intensity-distributed image being projected substantially orthogonal to each other to intersect in a photosensitive resin to volume-at-once cure an object in a single exposure.

And finally, FIG. 2 shows at least two sub-image beams (e.g. "Sub-image 1" and "Sub-image 2") which are produced by the projection optics and projected at various angles into a photosensitive resin bath so as to intersect therein. Each sub-image beam has an intensity profile corresponding to a section of the image. In particular, the at least two sub-image beams are shown produced by dividing a cross-section of the intensity modulated light beam downstream of the FTL 25, with a first sub-image beam, Sub-image 1, shown directed directly into the cuvette with resin in a z direction, and a second sub-image beam, Sub-image 2, shown directed into the cuvette at a substantially orthogonal direction (e.g. x direction) relative to the first sub-image beam using a 45-degree mirror ($M_{EX}$) placed in proximity to the final build volume. While not shown in FIG. 2, it is appreciated that in a 3-beam configuration, an additional mirror may be provided behind the cuvette (out of the drawing plane) to direct a third sub-image beam into the cuvette from a third orthogonal direction. FIG. 3 is provided to show an isometric illustration 30 of how three sub-sections 31-33 of an image may be projected as sub-image beams substantially orthogonal to each other to intersect in a photosensitive resin and thereby simultaneously cure all parts of an object 34 with voids and other features in a single exposure.

In any case, these sub-image beams each carrying an intensity profile of a corresponding one of the sections of the image enter the build volume substantially at right angles to each other to intersect with each other. The angles and the number of beams can be adjusted without changing the fundamental concept. The intersection of these patterns results in a complex 3D pattern with controllable areas of high intensity, and with appropriately chosen exposure parameters the 3D structure is formed. It is appreciated that this approach is one of several possible paths to obtaining complex 3D light patterns. In another example embodiment, multiple SLMs may be used which are illuminated by the same light source, or by different light sources, to produce separate intensity-distributed images which are projected to intersect in the build volume. In this manner, arbitrary 3D patterns may be generated and projected Into the photosensitive resin to generate 3D structures without the need for Z-stage adjustment.

Because the goal of the present invention is to produce a 3D structure formation within the bulk of a liquid photopolymer, rather than in layers at a surface, a resin formulation that is minimally absorptive is preferably used. An example resin which may be used in the present invention is poly (ethylene glycol) diacrylate (PEGDA, MW=250) with 0.04% (w/w) Irgacure 784, which is a titanocene free-radical photoinitiator with its absorbance spectrum extending to the 532 nm wavelength of the laser source. Other example materials may include, hexandiol diacrylate (HDDA), polyethylene glycol diacrylate (PEGDA), tBA-PEGDMA (a shape memory polymer), POSS-diacrylate. Additionally, the need to project and intersect patterned beams in the build volume requires optical access from at least two sides of the build volume. In an illustrative example, to hold the resin volume of approx. 1 mL, a fluorometer cell (Starna Cells, 3-G-10) may be used having 10×10×45 mm internal volume, and 1.25 mm thick polished glass sides and bottom. As with many resin-based systems, exposure doses vary depending on optical power density and geometry. In example experiments performed, with a 3-beam configuration, polymer parts were successfully produced using 12 s exposures at an estimated power of 30 $mW/cm^2$ incident onto the cuvette from each side, corresponding to an estimated volumetric cure dose of ~250 $mJ/cm^3$. It is appreciated that the photosensitive resin bath may be provided in much larger scales as well.

While not shown in the figures, a second example embodiment of the present invention is based on amplitude (intensity) modulation and uses an amplitude-modulating SLM to impress an intensity profile of an image onto a light beam produced by a light source (e.g. and incoherent light source), and which uses projection optics that is adapted to produce at least two sub-image beams, such as by dividing a cross-section of the intensity-modulated light beam, in a manner similar to the discussion above for the phase-modulation embodiment. Here too each sub-image beam has an intensity profile corresponding to a section of the image. Furthermore, the projection optics is adapted to project the at least two sub-image beams to intersect each other in the photosensitive resin so as to simultaneously cure select volumetric regions thereof in a 3D pattern representing all of the object. It is appreciated that this second example embodiment is similar to the multi-beam volumetric resin curing system of FIG. 2, but may be simpler in that it would not require, for example, the FTL or beam block for its operation.

Although the description above contains many details and specifics, these should not be construed as limiting the scope of the invention but as merely providing illustrations of some of the example embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention folly encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

We claim:

1. A multi-beam resin curing system for whole-volume additive manufacturing of an object, comprising:
    a bath containing a photosensitive resin;
    a light source for producing a light beam;
    a spatial light modulator (SLM) adapted to impress an image onto the light beam so as to produce a modulated light beam; and
    projection optics adapted to produce at least two sub-image beams from the modulated light beam with each sub-image beam having a 2D intensity profile corresponding to a section of the image, and to optically transport the at least two sub-image beams independently of each other into the bath containing the photosensitive resin so as to project the 2D intensity profiles of the at least two sub-image beams to pass through a volume of the photosensitive resin so that the projected 2D intensity profiles transversely intersect each other in the volume of the photosensitive resin to form a 3D pattern which simultaneously cures select volumetric regions of the volume of the photosensitive resin and thereby forms the object.

2. The multi-beam resin curing system of claim 1,
    wherein the SLM is adapted to impress a phase profile of the image onto the light beam so as to produce a phase-modulated light beam; and
    wherein the projection optics are adapted to produce the at least two sub-image beams by:
        deconvolving the phase-modulated light beam into an intensity-modulated light beam having an intensity profile corresponding to all sections of the image,
        dividing a cross-section of the intensity-modulated light beam into the at least two sub-image beams.

3. The multi-beam resin curing system of claim 1,
    wherein the SLM is adapted to impress an intensity profile corresponding to all subsections of the image onto the light beam so as to produce an intensity-modulated light beam; and
    wherein the projection optics are adapted to produce the at least two sub-image beams by dividing a cross-section of the intensity-modulated light beam into the at least two sub-image beams.

4. The multi-beam resin curing system of claim 1,
    wherein the projection optics are adapted to project the at least two sub-image beams to intersect substantially orthogonal to each other.

5. A multi-beam resin curing system for whole-volume additive manufacturing of an object, comprising:
    a bath containing a photosensitive resin;
    a single mode laser source for producing a laser beam;
    a spatial light modulator (SLM) adapted to impress a phase profile of an image onto the laser beam so as to produce a phase-modulated laser beam; and
    projection optics adapted to deconvolve the phase-modulated laser beam into an intensity-modulated laser beam, produce at least two sub-image beams from the intensity-modulated laser beam with each sub-image beam having a 2D intensity profile corresponding to a section of the image, and to optically transport the at least two sub-image beams independently of each other into the bath containing the photosensitive resin so as to project the 2D intensity profiles of the at least two sub-image beams to pass through a volume of the photosensitive resin so that the projected 2D intensity profiles transversely intersect each other in the volume of the photosensitive resin to form a 3D pattern which simultaneously cures select volumetric regions of the volume of the photosensitive resin and thereby forms the object.

* * * * *